(12) United States Patent
Coppola et al.

(10) Patent No.: US 11,658,525 B2
(45) Date of Patent: May 23, 2023

(54) ELECTRIC MOTOR ASSEMBLY USING POLYMER-ONLY FASTENING AND METHODS OF MANUFACTURING THE SAME

(71) Applicant: GM GLOBAL TECHNOLOGY OPERATIONS LLC, Detroit, MI (US)

(72) Inventors: Anthony M. Coppola, Rochester Hills, MI (US); Alireza Fatemi, Canton, MI (US); William T. Ivan, Shelby Township, MI (US); Song He, Troy, MI (US); Yew Sum Leong, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 225 days.

(21) Appl. No.: 17/066,520

(22) Filed: Oct. 9, 2020

(65) Prior Publication Data

US 2022/0115922 A1 Apr. 14, 2022

(51) Int. Cl.
*H02K 1/18* (2006.01)
*H02K 1/20* (2006.01)
(Continued)

(52) U.S. Cl.
CPC ............... *H02K 1/185* (2013.01); *H02K 1/20* (2013.01); *H02K 9/19* (2013.01); *H02K 11/014* (2020.08); *H02K 15/028* (2013.01); *H02K 15/12* (2013.01)

(58) Field of Classification Search
CPC . H02K 9/19; H02K 1/185; H02K 5/24; F16D 1/0835; F16F 1/3732
(Continued)

(56) References Cited

U.S. PATENT DOCUMENTS 1,688,891 A * 10/1928 Spreen .................. H02K 1/185
310/410
5,290,018 A * 3/1994 Watanabe ............... F16F 1/387
267/293
(Continued)

FOREIGN PATENT DOCUMENTS

EP 1100180 A2 * 5/2001 ............... H02K 5/08
JP 2010119157 A * 5/2010 ............... H02K 5/04
(Continued)

*Primary Examiner* — Burton S Mullins
(74) *Attorney, Agent, or Firm* — Quinn IP Law

(57) ABSTRACT

An electric motor assembly includes a housing having a generally cylindrical inner surface defining a generally cylindrical cavity within the housing, a stator operatively disposed within the generally cylindrical cavity, the stator including a plurality of stacked laminations wherein each lamination has an outer circumferential edge and a plurality of finger elements extending inward, and a layer of polymer disposed between a generally cylindrical outer surface of the stator and the generally cylindrical inner surface of the housing, such that the stator is fastened to the housing by the polymer. A method of manufacturing the electric motor assembly includes disposing a stator within a housing such that a gap is defined between the stator and the housing and the stator is not directly connected to the housing, and substantially filling the gap with a polymer capable of fastening the stator to the housing by only the polymer.

17 Claims, 13 Drawing Sheets

(51) Int. Cl.
　　*H02K 15/12*　　(2006.01)
　　*H02K 11/01*　　(2016.01)
　　*H02K 15/02*　　(2006.01)
　　*H02K 9/19*　　(2006.01)

(58) Field of Classification Search
　　USPC .................. 310/51, 89; 248/638; 267/294
　　See application file for complete search history.

(56) References Cited

U.S. PATENT DOCUMENTS

| | | | | |
|---|---|---|---|---|
| 6,657,356 B2* | 12/2003 | Laurent | .................. | H02K 15/02 310/216.004 |
| 7,804,215 B2* | 9/2010 | Hemmelmann | .......... | F03D 9/25 310/104 |
| 7,868,497 B2* | 1/2011 | Miyairi | .................... | H02K 5/10 310/88 |
| 8,182,134 B2* | 5/2012 | Perkins | .................. | B29B 7/007 366/158.5 |
| 8,292,312 B2* | 10/2012 | Kato | ..................... | F16F 1/3842 280/124.152 |
| 9,356,493 B2* | 5/2016 | Buehler | .................. | H02K 9/223 |
| 10,284,053 B2* | 5/2019 | Saiki | ....................... | H02K 5/203 |
| 10,840,773 B2* | 11/2020 | Takano | .................... | H02K 9/00 |
| 11,283,310 B2* | 3/2022 | Dotz | ........................ | H02K 1/165 |
| 2002/0135244 A1* | 9/2002 | Strong | .................. | H02K 1/185 318/258 |
| 2008/0143203 A1* | 6/2008 | Purvines | .................. | H02K 1/20 310/71 |
| 2019/0363598 A1* | 11/2019 | Coppola | ............... | H02K 15/085 |

FOREIGN PATENT DOCUMENTS

| | | | | |
|---|---|---|---|---|
| JP | 2011188545 A | * | 9/2011 | ............... H02K 1/18 |
| KR | 101178728 B1 | * | 8/2012 | ............... H02K 9/19 |

* cited by examiner

-- Prior Art --

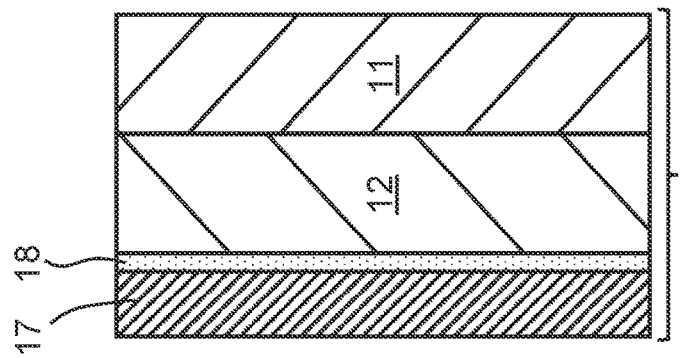
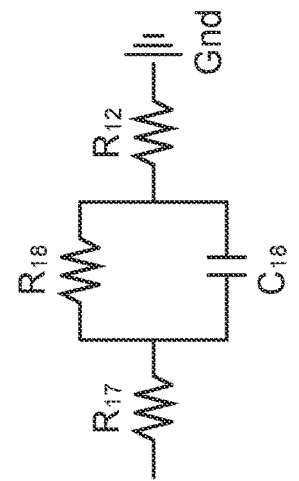
FIG. 7 — Prior Art —
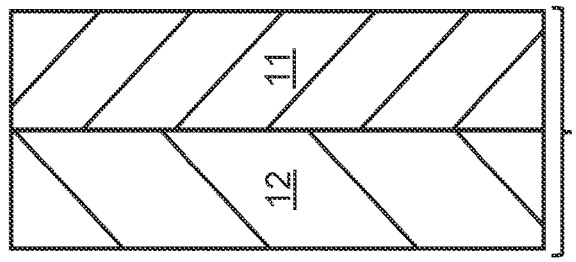
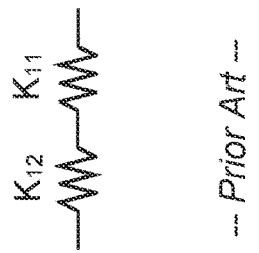
FIG. 8 — Prior Art —
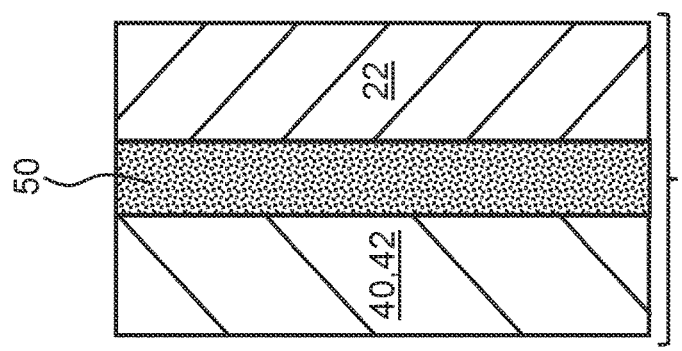
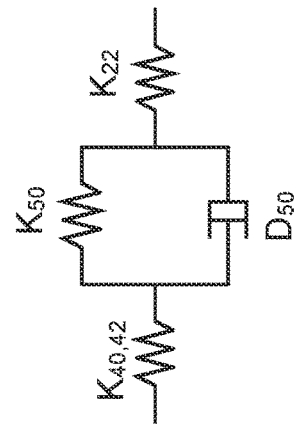
FIG. 9

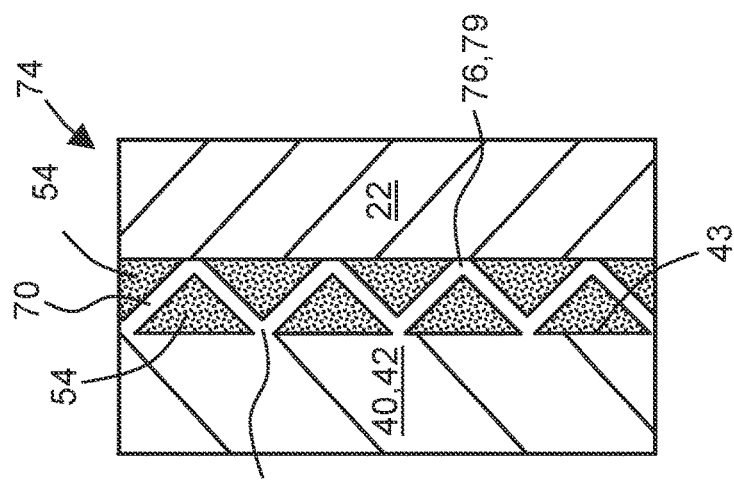
FIG. 12
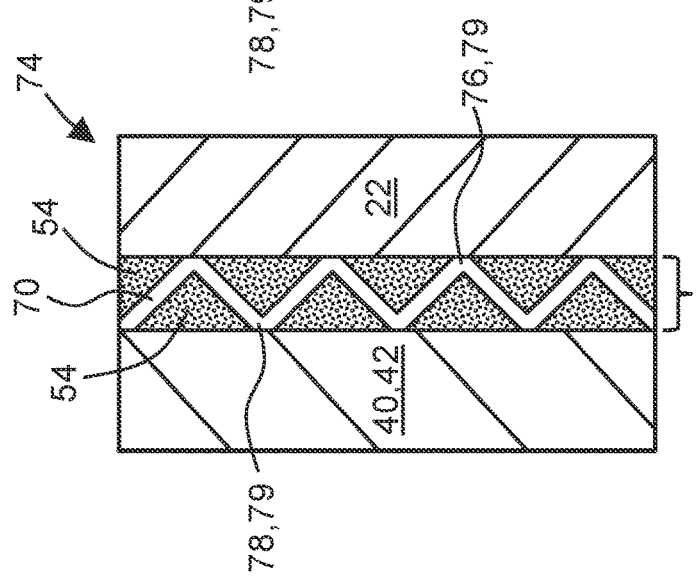
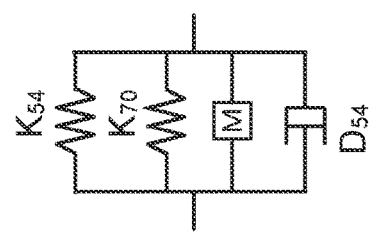
FIG. 11
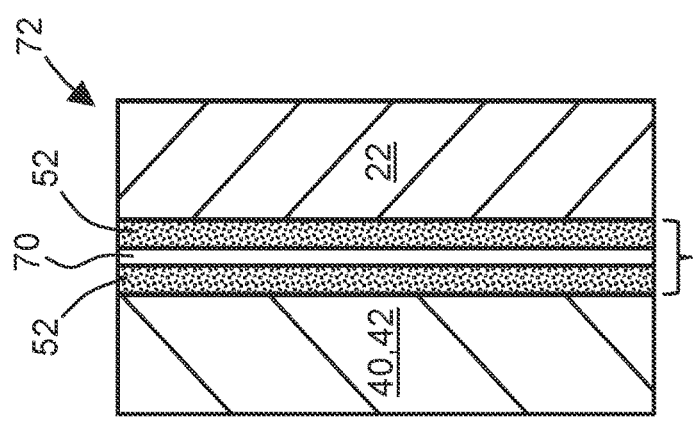
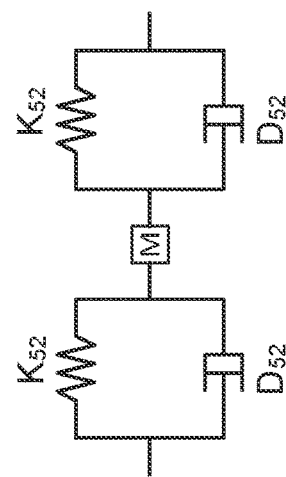
FIG. 10

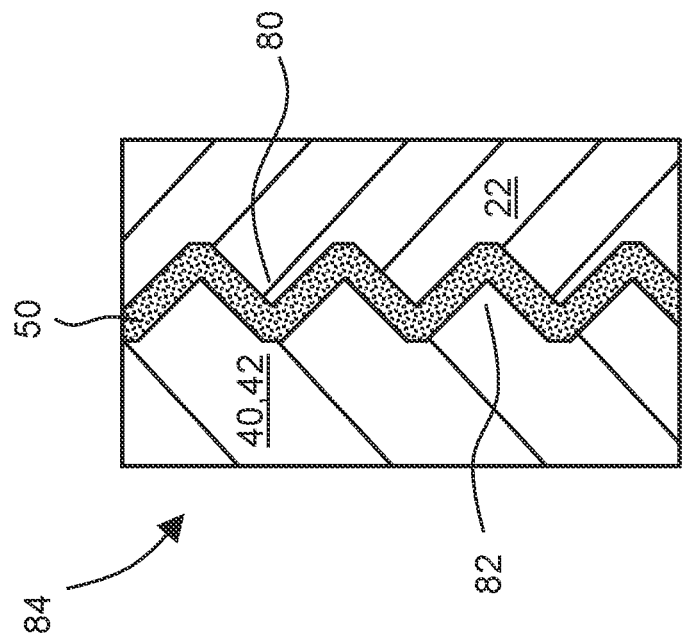
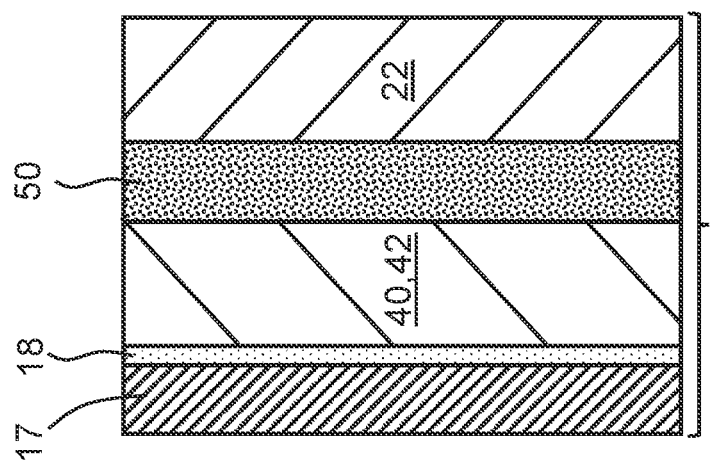 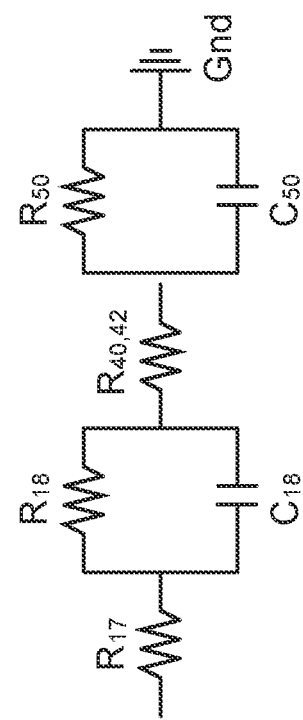
FIG. 13
FIG. 14

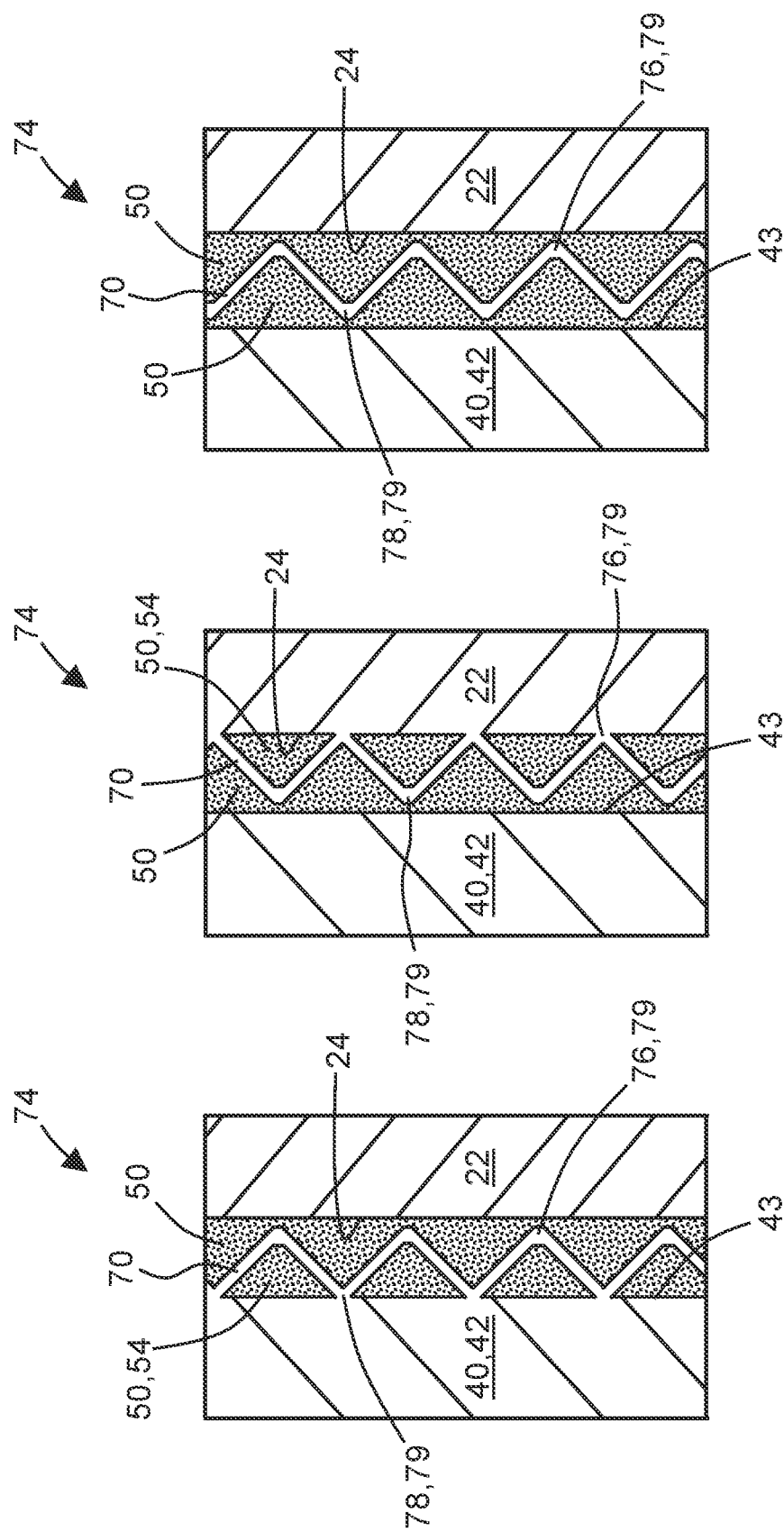

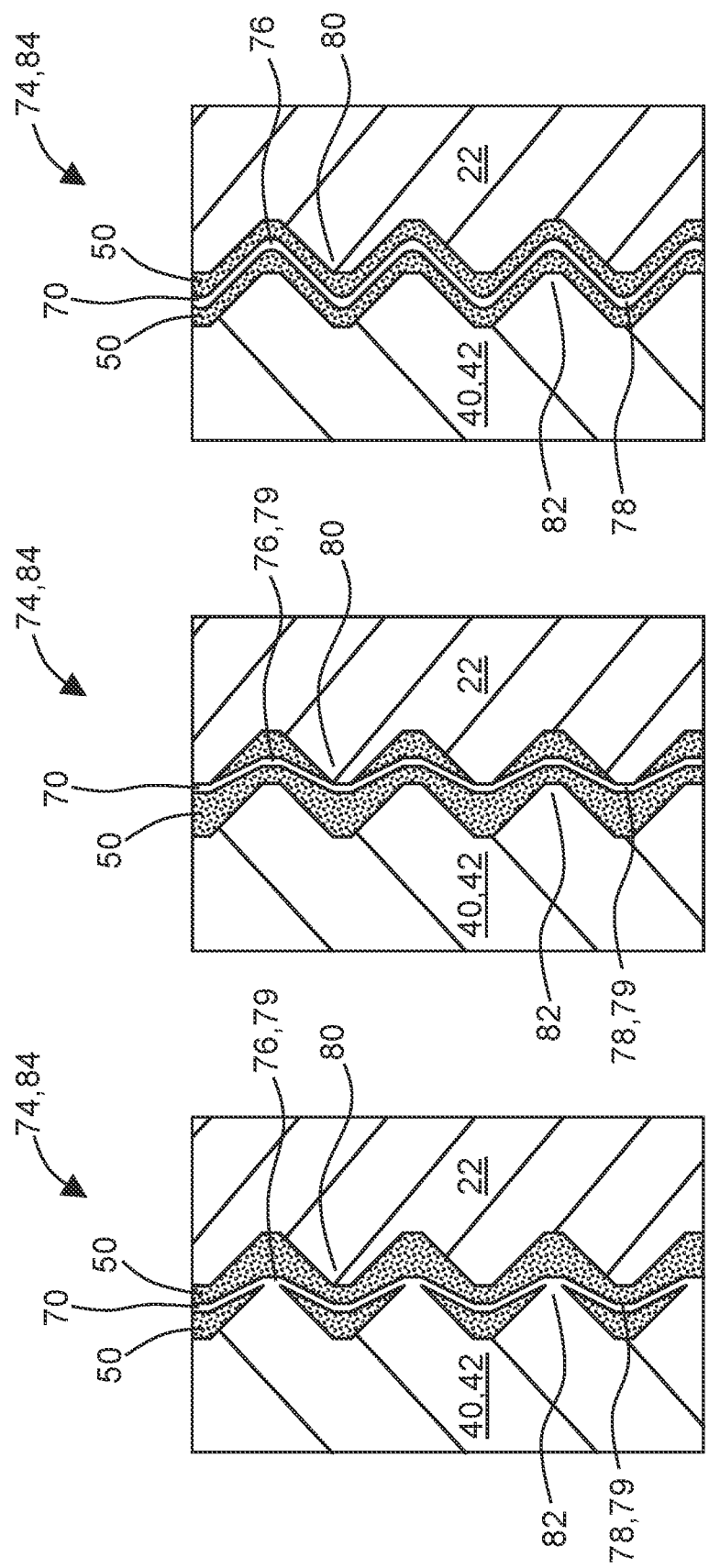

ELECTRIC MOTOR ASSEMBLY USING POLYMER-ONLY FASTENING AND METHODS OF MANUFACTURING THE SAME

INTRODUCTION

This disclosure relates to electric motor assemblies using only a polymer to fasten the stator to the electric motor housing, and methods of manufacturing such electric motor assemblies.

An ordinary electric motor has a shaft attached to a rotatable rotor, with the rotor nested within a stator, and the stator in turn housed within a housing. Rotors customarily have an overall cylindrical shape, and stators ordinarily have a hollow cylindrical shape with an inner surface that is cylindrical (conforming to the size and shape of the rotor) and an outer surface that is usually also cylindrical (conforming to or otherwise fitting within the interior of the housing).

Stators are typically made of flat, circular metal laminations which are stacked together. Each lamination has a plurality of inwardly extending fingers, with some (or all) of the laminations having multiple ears or tabs extending outward from the circular outer edges of the laminations. These ears or tabs are used to mechanically fasten the laminations (and thus the stator) to the housing.

Enamel-coated copper wire is used to form windings about the inwardly extending fingers of the laminations. During operation of the electric motor, the housing acts as a ground, and stray electrical currents may flow from the stator windings to the grounded housing. Additionally, the enamel coated wire acts as a resistor-capacitor network which causes fluctuations in these stray electrical currents. Together these stray currents and capacitance fluctuations may cause undesirable electrical noise in the electric motor, which may require additional countermeasures to filter out such noise.

SUMMARY

According to one embodiment, an electric motor assembly includes a housing having a generally cylindrical inner surface defining a generally cylindrical cavity within the housing, a stator operatively disposed within the generally cylindrical cavity, the stator comprising a plurality of stacked laminations wherein each lamination has an outer circumferential edge and a plurality of finger elements extending inward toward a center of the lamination, and a layer of polymer disposed between a generally cylindrical outer surface of the stator and the generally cylindrical inner surface of the housing, such that the stator is fastened to the housing by the polymer. A gap having a generally cylindrical shell shape may be defined between the stator and the housing, wherein the layer of polymer substantially fills the gap. The polymer may have material characteristics which provide a predetermined electrical filtering of electrical noise between the stator and the housing. Optionally, a network of cooling channels may be formed in the layer of polymer by forming a network of sacrificial elements made of a sacrificial material on a generally cylindrical outer surface of the stator and subsequently removing the sacrificial material after curing the polymer.

The electric motor assembly may be configured such that none of the laminations is directly connected to the housing, and/or such that the stator is not directly connected to the housing. The embodiment may also be configured such that the stator is fastened to the housing by only the polymer.

The electric motor assembly may also include a rotor operatively disposed within a generally cylindrical inner stator cavity. This arrangement may be configured such that the layer of polymer is effective to prevent rotation of the stator with respect to the housing. The electric motor assembly may further include an arcuate metallic strip circumferentially disposed within the layer of polymer, wherein the arcuate metallic strip may be configured as one of (i) a flat shape configuration wherein the arcuate metallic strip is spaced apart from both the stator and the housing, and (ii) a wavy shape configuration wherein the arcuate metallic strip is disposed in contact with both the stator and the housing, one of the stator and the housing, or neither of the stator and the housing. In the wavy shape configuration, the arcuate metallic strip may be integral with an outer circumferential edge of one of the laminations.

The housing may include a plurality of protrusions each extending inward from the generally cylindrical inner surface and the stator may include a plurality of protuberances each extending outward from the generally cylindrical outer surface, wherein the protrusions and protuberances may be interleaved with each other.

According to another embodiment, an electric motor assembly includes: (i) a metal housing having a generally cylindrical inner surface defining a generally cylindrical cavity within the housing; (ii) a stator operatively disposed within the generally cylindrical cavity, the stator comprising a plurality of stacked metallic laminations wherein each lamination has an outer circumferential edge and a plurality of finger elements extending inward toward a center of the lamination, wherein a gap having a generally cylindrical shell shape is defined between the stator and the housing and none of the laminations is directly connected to the housing; and (iii) a layer of polymer substantially filling the gap, such that the stator is fastened to the housing by only the polymer. In this embodiment, the polymer has material characteristics which provide a predetermined electrical filtering of electrical noise between the stator and the housing.

The electric motor assembly may also include a rotor operatively disposed within a generally cylindrical inner stator cavity, wherein the layer of polymer is effective to prevent rotation of the stator with respect to the housing during operation of the electric motor assembly. The electric motor assembly may further include an arcuate metallic strip circumferentially disposed within the layer of polymer, wherein the arcuate metallic strip may be configured as one of (i) a flat shape configuration wherein the arcuate metallic strip is spaced apart from both the stator and the housing, and (ii) a wavy shape configuration wherein the arcuate metallic strip is disposed in contact with both the stator and the housing, one of the stator and the housing, or neither of the stator and the housing.

According to yet another embodiment, a method of manufacturing an electric motor assembly includes disposing a stator within a housing such that a gap is defined between the stator and the housing and the stator is not directly connected to the housing, and substantially filling the gap with a polymer capable of fastening the stator to the housing by only the polymer. The method may further include curing the polymer such that the stator is fastened to the housing by only the polymer. In this embodiment, the polymer may have material characteristics which provide a predetermined electrical filtering of electrical noise between the stator and the housing when the polymer is cured. The method may further include inserting an arcuate metallic strip within the gap, wherein the arcuate metallic strip may be configured as one of (i) a flat shape configuration wherein the arcuate metallic strip is spaced apart from both the stator and the housing, and (ii) a wavy shape configuration wherein the arcuate metallic strip is disposed in contact with both the stator and the housing, one of the stator and the housing, or neither of the stator and the housing. The method may also include forming a network of sacrificial elements made of a sacrificial material on a generally cylindrical outer surface of the stator, and removing the sacrificial material after curing the polymer so as to form a network of cooling channels on the generally cylindrical outer surface of the stator.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

FIGS. 7-8 are schematic cross-sectional close-up views of a portion of a housing and stator lamination of an electric motor, illustrating electrical and mechanical properties thereof, respectively.

FIG. 9 is a schematic cross-sectional close-up view of a portion of an electric motor assembly, illustrating mechanical properties thereof.

FIG. 10 is a schematic cross-sectional close-up view of a portion of an electric motor assembly including an arcuate metallic strip in a flat shape configuration, illustrating mechanical properties thereof.

FIG. 11 is a schematic cross-sectional close-up view of a portion of an electric motor assembly including an arcuate metallic strip in a wavy shape configuration, illustrating mechanical properties thereof.

FIG. 12 is a schematic cross-sectional close-up view of a portion of an electric motor assembly including an arcuate metallic strip in a wavy shape configuration, in which the arcuate metallic strip is integral with the stator lamination.

FIG. 13 is a schematic cross-sectional close-up view of a portion of an electric motor assembly, illustrating electrical properties thereof.

FIG. 14 is a schematic cross-sectional close-up view of a portion of an electric motor assembly, illustrating housing protrusions and stator lamination protuberances interleaved with one another.

FIGS. 21-23 are schematic cross-sectional close-up views of a portion of an electric motor assembly including an arcuate metallic strip in a wavy shape configuration, in which the arcuate metallic strip is disposed in contact with the stator but not the housing, the housing but not the stator, and neither the stator nor the housing, respectively.

FIGS. 24-26 are schematic cross-sectional close-up views of a portion of an electric motor assembly having housing protrusions and stator lamination protuberances interleaved with one another and including an arcuate metallic strip in a wavy shape configuration, in which the arcuate metallic strip is disposed in contact with the stator but not the housing, the housing but not the stator, and neither the stator nor the housing, respectively.

DETAILED DESCRIPTION

Figure 1:
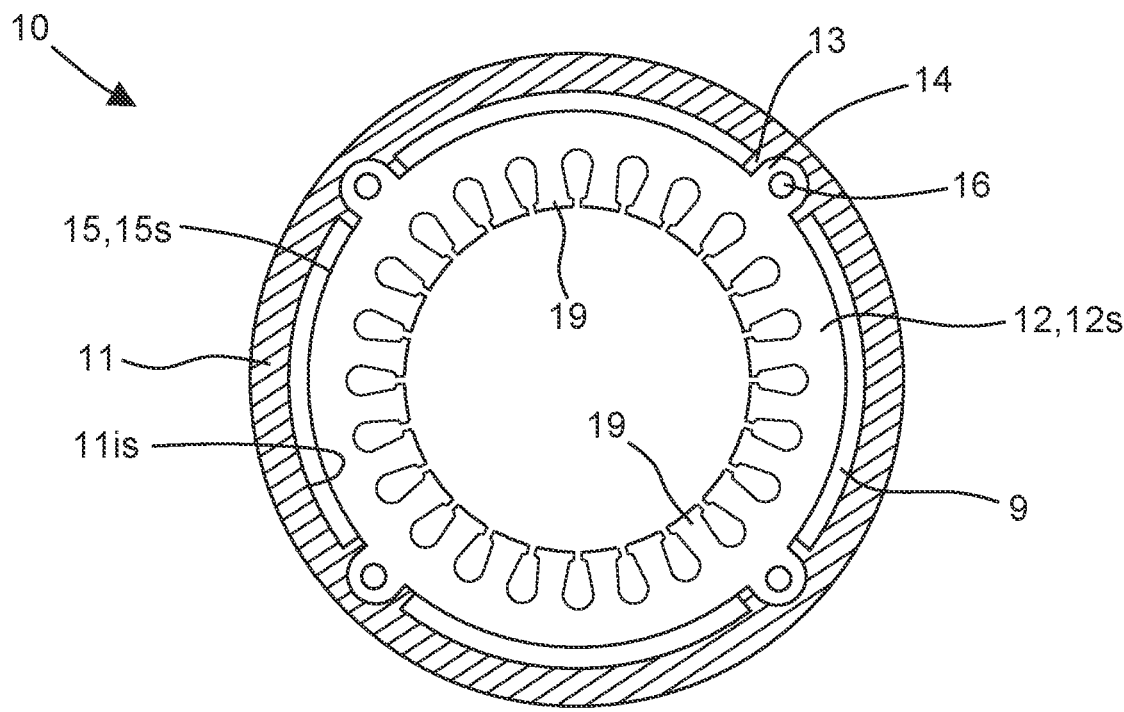
FIG. 1 is a schematic cross-sectional elevation view of a housing and stator lamination of an ordinary electric motor.

Referring now to the drawings, wherein like numerals indicate like parts in the several views, an electric motor assembly 20 and methods 100, 200 for manufacturing the electric motor assembly 20 are shown and described herein.

FIG. 1 shows a schematic cross-sectional view of a housing 11 and stator 12*s* of an ordinary electric motor 10. As mentioned above, stators 12*s* are typically made of flat metal laminations 12 which are stacked together, with enamel-coated copper wire (not shown) wound around the inwardly extending fingers 19 of the laminations 12. The housing 11 may be generally annular in cross-section as illustrated in FIG. 1, or it may assume other shapes (e.g., rectangular), but in most cases the housing 11 will have an inner surface 11*is* which is generally cylindrical (or appearing circular, in cross-section), which conforms with the generally cylindrical outer surface 15*s* of the stator 12*s*. The housing 11 also has a plurality of lugs or mounting points 13 extending inward from the housing's inner surface 11*is*. Each of the laminations 12 has a generally circular outer circumferential edge 15, such that when the laminations 12 are stacked together they form the stator 12*s*, and the generally circular outer circumferential edges 15 of all the laminations 12 together form the generally cylindrical outer surface 15*s* of the stator 12*s*. Some or all of the laminations 12 also include a plurality of tabs 14 extending outward from the outer circumferential edge 15. The tabs 14 have holes 16 which align with corresponding holes in the lugs or mounting points 13, so that fasteners (e.g., bolts, not shown) may be used to mechanically fasten the laminations 12, and thereby the whole stator 12*s*, to the housing 11. This mechanical fastening keeps the stator 12*s* centrally and coaxially oriented with respect to the housing's inner surface 11*is* (thus providing a generally uniform gap or spacing 9 between the outer surface 15*s* of the stator 12*s* and the inner surface 11*is* of the housing 11), and also prevents the stator 12*s* from rotating within the housing 11 during operation of the electric motor 10.

FIG. 7 shows a schematic cross-sectional close-up view of a portion of the housing 11 and stator lamination 12, illustrating the electrical properties thereof. (Note that while the drawings show a lamination 12, the drawings may also be seen as applying to an arrangement with the stator 12*s* substituted in for the lamination 12.) As shown in FIG. 7, the copper wire 17, enamel coating 18, lamination 12 and housing 11 may be viewed as forming a sandwich or arrangement in which the copper wire 17 has a resistance $R_{17}$, the enamel coating 18 has a resistance $R_{18}$ and a capacitance $C_{18}$, the lamination 12 (or stator 12*s*) has a resistance $R_{12}$, and the housing 11 serves as a ground Gnd. This arrangement shows how electrical current may leak from the copper wire 17 to ground Gnd through the enamel coating 18 and laminations 12, and how the enamel coating 18 may create capacitance fluctuations in the electrical current leak due to the coating's capacitive effect. Together, these leakages and fluctuations cause or contribute to electrical noise in the electric motor 10 and its electrical system, which may also affect neighboring electrical components and systems.

FIG. 8 shows a schematic cross-sectional close-up view of a portion of the housing 11 and stator lamination 12 or stator 12s, illustrating mechanical properties thereof. The lamination/stator 12, 12s may be viewed as acting like a spring $K_{12}$ connected in series with another spring $K_{11}$ representing the housing. (Alternatively, $K_{12}$ may also include the copper wire 17 and enamel coatings 18 of the stator windings.) Thus, the stator-housing combination 12s, 11 may be seen as a mechanical system, thus having resonant frequencies, harmonic nodes and other characteristics of mechanical systems which may cause, contribute to or be susceptible to various vibrations and the like.

The electric motor assembly 20 and methods 100, 200 for manufacturing the electric motor assembly 20 described herein offer a unique combination of features and advantages which help mitigate the aforementioned electrical and mechanical challenges.

Figure 2:
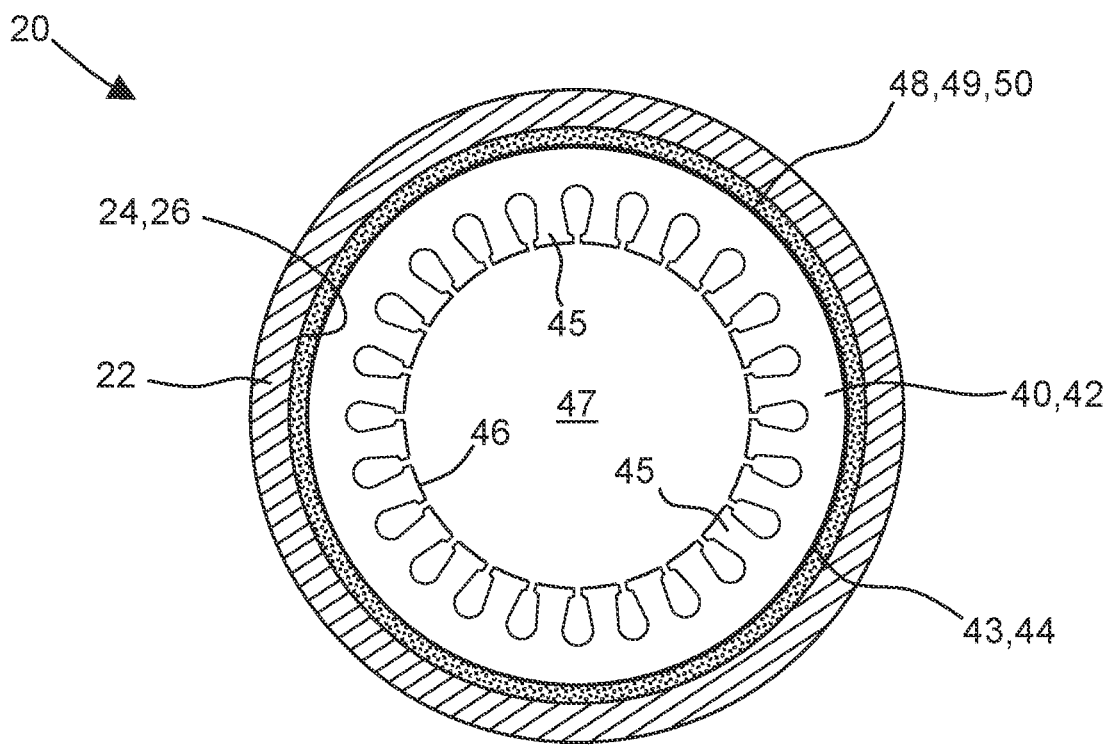
FIG. 2 is a schematic cross-sectional elevation view of an electric motor assembly.

FIG. 2 shows one embodiment of an electric motor assembly 20 which addresses these challenges. The electric motor assembly 20 includes a housing 22 having a generally cylindrical inner surface 24 defining a generally cylindrical cavity 26 within the housing 22, and a stator 40 operatively disposed within the generally cylindrical cavity 26. The stator 40 is made up of a plurality of stacked laminations 42, wherein each lamination 42 has an outer circumferential edge 43 and a plurality of finger elements 45 extending inward toward a center of the lamination 42 and terminating at an inner circumferential edge 46. (The outer and inner circumferential edges 43, 46 may be generally circular and concentric with each other.) Unlike the customary arrangement shown in FIG. 1, note that in FIG. 2 no lugs or mounting points 13 extend inward from the housing 22, and no tabs 14 extend outward from the laminations 42 or stator 40, and no direct mechanical connection is provided between the stator 40 and the housing 22. Instead, a circumferential gap or spacing 48 is provided between the stator 40 and the housing 22, and the gap 48 is filled (either partially or completely) with a polymer 50. In other words, a layer of polymer 50 is disposed between a generally cylindrical outer surface 44 of the stator 40 and the generally cylindrical inner surface 24 of the housing 22, such that the stator 40 is fastened to the housing 22 by the polymer 50. In this arrangement, the gap 48 may have a generally cylindrical shell shape 49 between the stator 40 and the housing 22, wherein the layer of polymer 50 substantially fills the gap 48.

The polymer 50 may have material characteristics which provide a predetermined electrical filtering of electrical noise between the stator 40 and the housing 22. For example, the polymer 50 may contain graphene or other conductive, semiconductive or insulative materials to facilitate the electrical noise filtering. Also, the polymer 50 itself may be made from materials selected to optimally minimize, mitigate or prevent electrical noise, and/or to alter its electrical characteristics. The polymer 50 may also have mechanical and material properties (e.g., density, hardness, elasticity, damping characteristics, tensile strength, melting point, etc.) which make it suitable for fastening or bonding the stator 40 to the housing 22 while providing a desired mix of rigidity and flexibility. The polymer 50 may be a thermoplastic material or a thermoset material.

The electric motor assembly 20 may be configured such that none of the laminations 42 is directly connected to the housing 22, and/or such that the stator 40 is not directly connected to the housing 22. The electric motor assembly 20 may also be configured such that the stator 40 is fastened to the housing 22 by only the polymer 50, and without mechanical fasteners or features such as the lugs or mounting points 13 and tabs 14 shown in FIG. 1.

Figure 3:
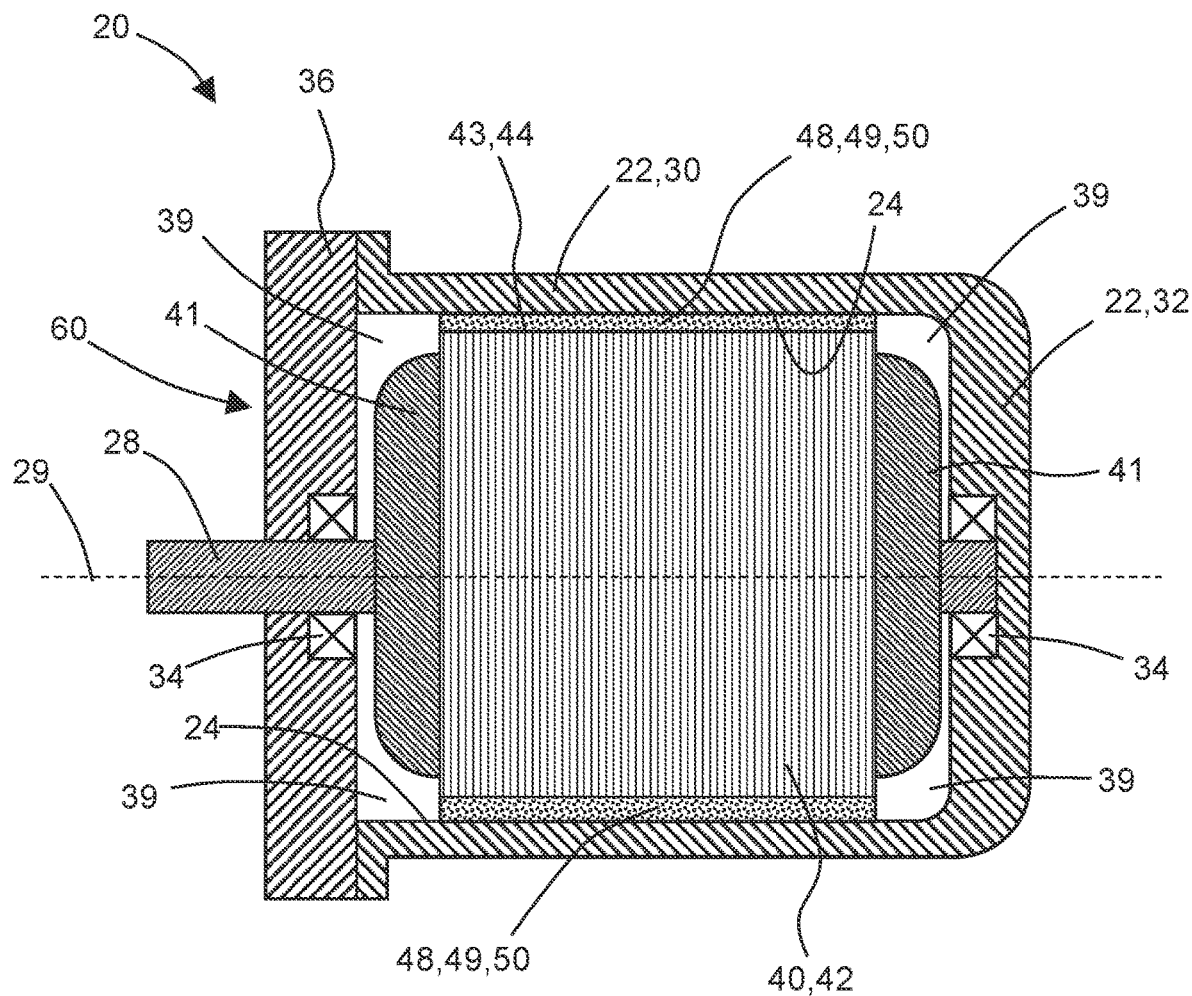
FIGS. 3-5 are schematic partial cross-sectional side views of an electric motor assembly according to first, second and third variants thereof, respectively.
Figure 4:
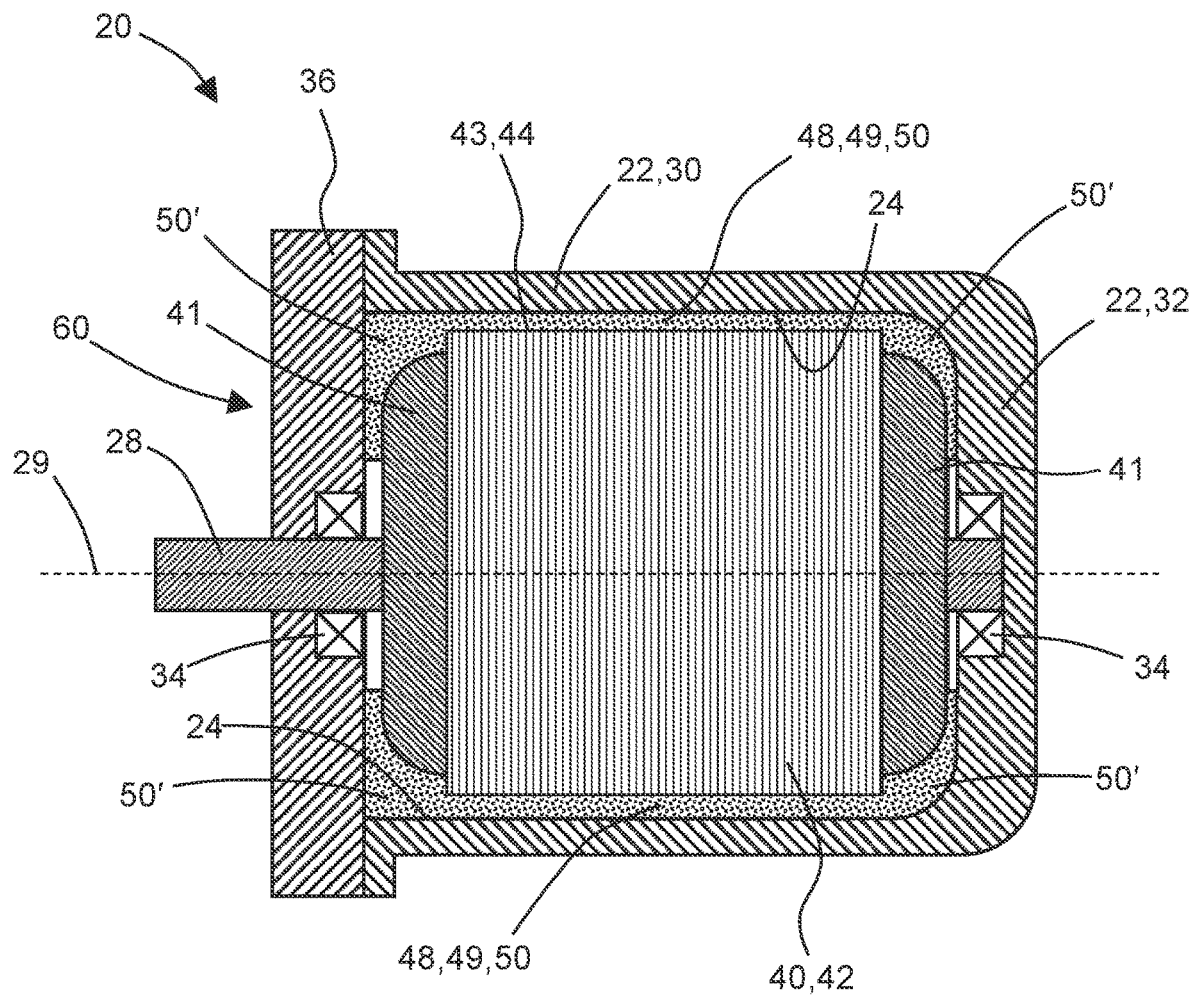
Figure 5:
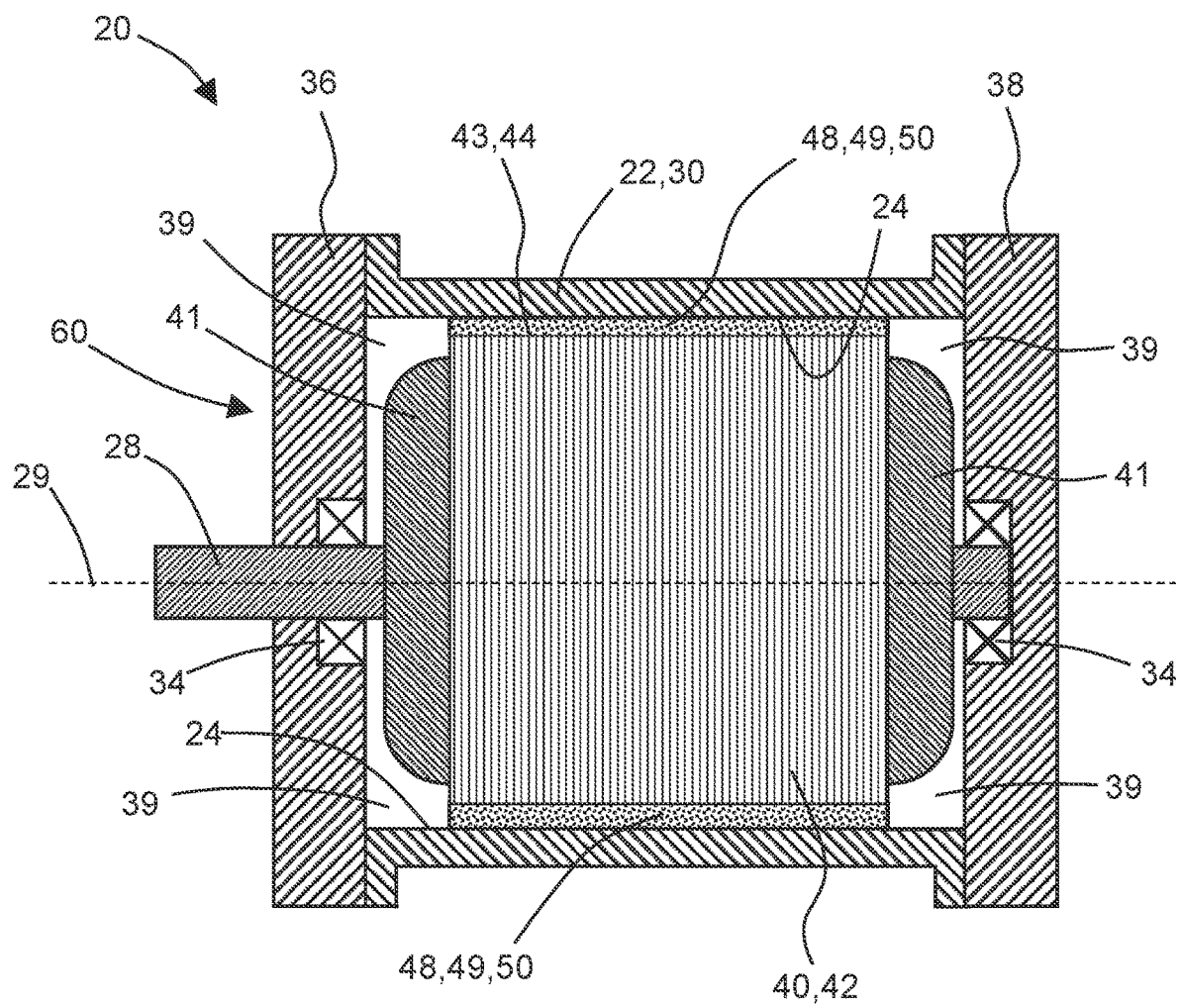

FIGS. 3-5 show schematic partial cross-sectional views of an electric motor assembly 20 according to first, second and third variants thereof, respectively. In the first variant shown in FIG. 3, the housing 22 has an "open can" shape, with a generally cylindrical or rectangular shell wall 30 and a generally circular or rectangular end wall 32. The stator 40 and laminations 42 have stator windings 41 (formed of enamel-coated copper wire), with the stator 40 situated within the housing 22 such that a generally uniform circumferential gap or spacing 48 is provided between the generally cylindrical outer surface 44 of the stator 40 and the generally cylindrical inner surface 24 of the housing 22. A cap or endplate 36 is fastened against the housing 22 over the opening in the "open can" shape, with the endplate 36 having a hole and bearings 34 therein so as to support one end of a shaft 28 which carries a rotor 60. A blind hole and bearings 34 are also formed in the end wall 32 for supporting the other end of the rotor shaft 28. Corner regions 39, shown as voids or pockets in FIG. 3, are found in the "corners" where the shell wall 30 meets the end wall 32, and where the shell wall 30 meets the endplate 36. In this first variant, the polymer 50 fills the circumferential gap 48 just outboard of the stator 40, but does not extend into the corner regions/voids/pockets 39.

In the second variant shown in FIG. 4, the polymer 50 extends into and fills some or all of the corner regions 39, such that little or no empty void or pocket is left unfilled. And in the third variant shown in FIG. 5, the housing 22 has a circumferential shell wall 30 but no end wall 32 integral with the shell wall 30, and has two opposed caps or endplates 36, 38 fastened to the shell wall 30 as shown. The polymer 50 may fill the gap 48 just outboard of the stator 40 as shown here (and as similarly shown in FIG. 3), or the polymer 50 may optionally extend into the corner regions 39 similar to the second variant of FIG. 4.

Figure 6:
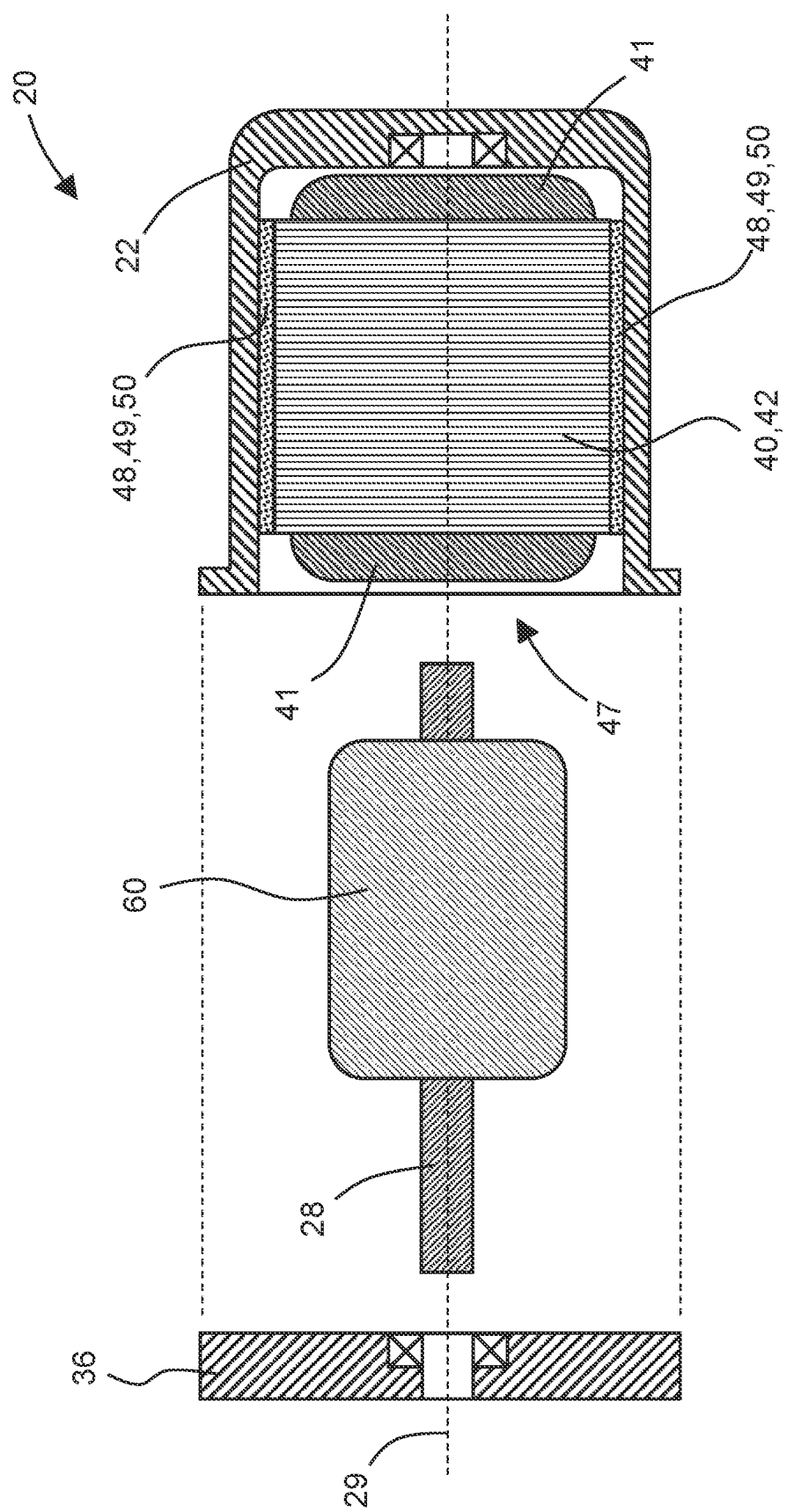
FIG. 6 is a schematic exploded partial cross-sectional elevation view of an electric motor assembly.

The electric motor assembly 20 may include a rotor 60 operatively disposed within a generally cylindrical inner stator cavity 47 within the stator 40. FIG. 6 shows the rotor 60 in an exploded cross-sectional view of the first variant of FIG. 3. Here, it can be seen that the rotor 60 (e.g., rotor windings) is formed around a shaft 28 having an axis of rotation 29. The end of the shaft 28 supporting the rotor 60 is inserted into the generally cylindrical inner stator cavity 47 within the stator 40, and the stator 40 is housed within the housing 22. After the polymer 50 is disposed so as to fill the gap 48 as desired, a cap or endplate 36 may be fastened to the housing 22 with the other end of the shaft 28 protruding through a bearinged hole in the endplate 36. This arrangement may be configured such that the layer of polymer 50 is effective to prevent rotation of the stator 40 with respect to the housing 22, including during operation of the electric motor assembly 20.

FIG. 9 shows a schematic cross-sectional view of a portion of an electric motor assembly 20, illustrating the mechanical properties thereof. Here, the layer of polymer 50 is illustrated as being sandwiched between the stator 40 or laminations 42 and the housing 22. The stator 40 or laminations 42 may be viewed as a spring $K_{40,42}$, the polymer 50 may be modeled as a spring $K_{50}$ and damper $D_{50}$ arranged in parallel, and the housing 22 may be seen as a spring $K_{22}$. (Note that $K_{40,42}$ may also include the copper wire 17 and enamel coatings 18 of the stator windings.) This arrangement of elements represents a mechanical spring-damper system, which has its own resonant frequencies, harmonic nodes and other mechanical system properties. This implies that the polymer 50 may be selected from particular materials so that the polymer's effective spring rate $K_{50}$ and dampening coefficient $D_{50}$ may complement or compensate for the mechanical properties of the overall stator-housing combination 40, 22. For example, the polymer 50 material may be selected to minimize or mitigate certain mechanical noise or vibrations caused or contributed to by the stator 40 and/or the housing 22. Thus, the use of a polymer 50 (rather than conventional tabs 14, mounting points 13 and fasteners) to fasten the stator 40 and housing 22 together offers ways to mechanically tune the electric motor assembly 20 that are not available using conventional fastening approaches.

FIG. 13 shows a schematic cross-sectional view of a portion of an electric motor assembly 20, illustrating the electrical properties thereof. The electrical circuit illustrated here is similar to that of FIG. 7, except here the layer of polymer 50 adds a resistance $R_{50}$ and capacitance $C_{50}$ as shown. As with the mechanical system illustrated in FIG. 9, the electrical system represented in FIG. 13 implies that the polymer 50 may be made of a material having electrical properties which may allow tuning the electrical filtering efficacy of the electric motor assembly 20 so as to minimize or mitigate electrical noise and interference.

FIGS. 10-12 and 21-26 show schematic cross-sectional views of a portion of an electric motor assembly 20 including an arcuate metallic strip 70, which is circumferentially disposed within the layer of polymer 50 in various configurations. This strip 70 may extend around the entirety of the circumference within the gap 48, or around only a portion of the circumference. The arcuate metallic strip 70 provides stiffness and mass, which can be tuned to serve as a vibration absorber targeting one or more resonant frequencies. The arcuate metallic strip 70 may be sized and dimensioned so as to fit within the gap 48 as desired, and may be configured in either a flat shape configuration 72 or a wavy shape configuration 74.

In the flat shape configuration 72 (FIG. 10), the arcuate metallic strip 70 is spaced apart from both the outer surface 44 of the stator 40 and the inner surface 24 of the housing 22. This essentially divides the layer of polymer 50 into two thinner polymer layers 52, which may have the same thickness as each other or they may have different thicknesses. The sandwich formed by the two thinner polymer layers 52 and the arcuate metallic strip 70 is illustrated as a mechanical system underneath the cross-sectional view of FIG. 10. Here, each thinner polymer layer 52 acts as a spring $K_{52}$ and a damper $D_{52}$, while the strip 70 acts as a mass M, together forming a particular spring-mass-damper system as shown.

In the wavy shape configuration 74 (FIGS. 11-12 and 21-26), the arcuate metallic strip 70 has a non-straight wavy shape or profile, with first crests 76 facing the inner surface 24 of the housing 22 and second crests 78 facing the outer surface 44 of the stator 40. The crests 76, 78 may be smoothly rounded (as illustrated in FIG. 26), or sharply pointed, or (as illustrated in FIGS. 11-12 and 21-25) may have flattened lands 79. The crests 76, 78 may be disposed in contact with either or both of the stator 40 and the housing 22, or they may contact neither. For example, as shown in FIG. 11, the first crests 76 are in contact with the housing 22 and the second crests 78 are in contact with the stator 40, whereas in FIGS. 21 and 24 the second crests 78 are in contact with the stator 40 and the first crests 76 are not in contact with the housing 22, in FIGS. 22 and 25 the first crests 76 are in contact with the housing 22 and the second crests 78 are not in contact with the stator 40, and in FIGS. 23 and 26 neither the first crests 76 nor the second crests 76 are in contact with either the housing 22 or the stator 40. In the wavy shape configuration 74, the arcuate metallic strip 70 may be integral with an outer circumferential edge 43 of one of the laminations 42. The strip 70 may extend longitudinally within the gap 48 (i.e., in a direction parallel with the axis of rotation 29), and may take the form of a circumferentially arcuate sheet.

In the wavy shape configuration 74 of FIGS. 11-12 and 21-22, the arcuate metallic strip 70 divides the layer of polymer 50 into a plurality of generally triangular-shaped or trapezoid-shaped portions 54. The zigzagged arrangement formed by these portions 54 and the arcuate metallic strip 70 is illustrated as a mechanical system underneath the cross-sectional view of FIG. 11. Here, the portions 54 act as a spring $K_{54}$ and a damper $D_{54}$, while the strip 70 acts as a spring $K_{70}$ and a mass M, all together forming the particular spring-mass-damper system shown.

FIG. 12 shows a variation of the wavy shape configuration 74, in which the arcuate metallic strip 70 is integral with one of the laminations 42. That is, the lamination 42 and the strip 70 are formed from the same metal stamping, with the second crests 78 and neighboring lands 79 being formed integral with the lamination's outer circumferential edge 43. Relatedly, FIGS. 21 and 24 show the arcuate metallic strip 70 being integral with the outer circumferential edge 43 of one of the laminations 42, and FIG. 22 shows the arcuate metallic strip 70 being integral with the inner surface 24 of the housing 22.

FIGS. 14 and 24-26 show schematic cross-sectional views of a portion of an electric motor assembly 20, in which the housing 22 has a plurality of protrusions 80 each extending inward from the generally cylindrical inner surface 24, and the stator 40 has a plurality of protuberances 82 each extending outward from the generally cylindrical outer surface 44. These protrusions 80 and protuberances 82 may be sized, shaped and arranged so as to be interleaved with each other in an interleaved arrangement 84. This interleaved arrangement 84 may be used, along with the polymer 50, as a mechanical interlock and as an additional torque retention/torque transfer feature between the stator 40 and the housing 22. As in the other configurations and arrangements discussed above, the layer of polymer 50 may also be used in the interleaved arrangement 84 to provide additional damping and to reduce stator vibration. As shown in FIG. 14, the interleaved arrangement 84 may be provided without the inclusion of an arcuate metallic strip 70; alternatively, as shown in FIGS. 24-26 the interleaved arrangement 84 may be provided with the inclusion of an arcuate metallic strip 70, with the strip 70 being in contact (and optionally integral) with the stator 40/laminate 42 but spaced apart from the housing 22 (FIG. 24), or with the strip 70 being in contact (and optionally integral) with the housing 22 but spaced apart from the stator 40/laminate 42 (FIG. 25), or with the strip 70 not being in contact with either of the housing 22 and the stator 40/laminate 42 (FIG. 26).

Optionally, a network 94 of cooling channels 96 may be formed in the layer of polymer 50 by first forming a network 90 of sacrificial elements 92 made of a sacrificial material on the generally cylindrical outer surface 44 of the stator 40, and then subsequently removing the sacrificial material after curing the polymer 50. Coolant (such as anti-freeze fluid, automatic transmission fluid, oil, etc.) may be circulated through these channels 96 in order to cool the electric motor assembly 20 during operation. The process for forming the network 94 of cooling channels 96 is discussed in more detail below.

According to another embodiment, an electric motor assembly 20 includes: (i) a metal housing 22 having a generally cylindrical inner surface 24 defining a generally cylindrical cavity 26 within the housing 22; (ii) a stator 40 operatively disposed within the generally cylindrical cavity 26, the stator 40 comprising a plurality of stacked metallic laminations 42 wherein each lamination 42 has an outer circumferential edge 43 and a plurality of finger elements 45 extending inward toward a center of the lamination 42, wherein a gap 48 having a generally cylindrical shell shape 49 is defined between the stator 40 and the housing 22 and none of the laminations 42 is directly connected to the housing 22; and (iii) a layer of polymer 50 substantially filling the gap 48, such that the stator 40 is fastened to the housing 22 by only the polymer 50. In this embodiment, the polymer 50 has material characteristics which provide a predetermined electrical filtering of electrical noise between the stator 40 and the housing 22.

In this embodiment, the electric motor assembly 20 may also include a rotor 60 operatively disposed within a generally cylindrical inner stator cavity 47, wherein the layer of polymer 50 is effective to prevent rotation of the stator 40 with respect to the housing 22 during operation of the electric motor assembly 20. The electric motor assembly 20 may further include an arcuate metallic strip 70 circumferentially disposed within the layer of polymer 50, wherein the arcuate metallic strip 70 may be configured as one of (i) a flat shape configuration 72 wherein the arcuate metallic strip 70 is spaced apart from both the stator 40 and the housing 22, and (ii) a wavy shape configuration 74 wherein the arcuate metallic strip 70 is disposed in contact with both the stator 40 and the housing 22, one of the stator 40 and the housing 22, or neither of the stator 40 and the housing 22.

Figure 15:
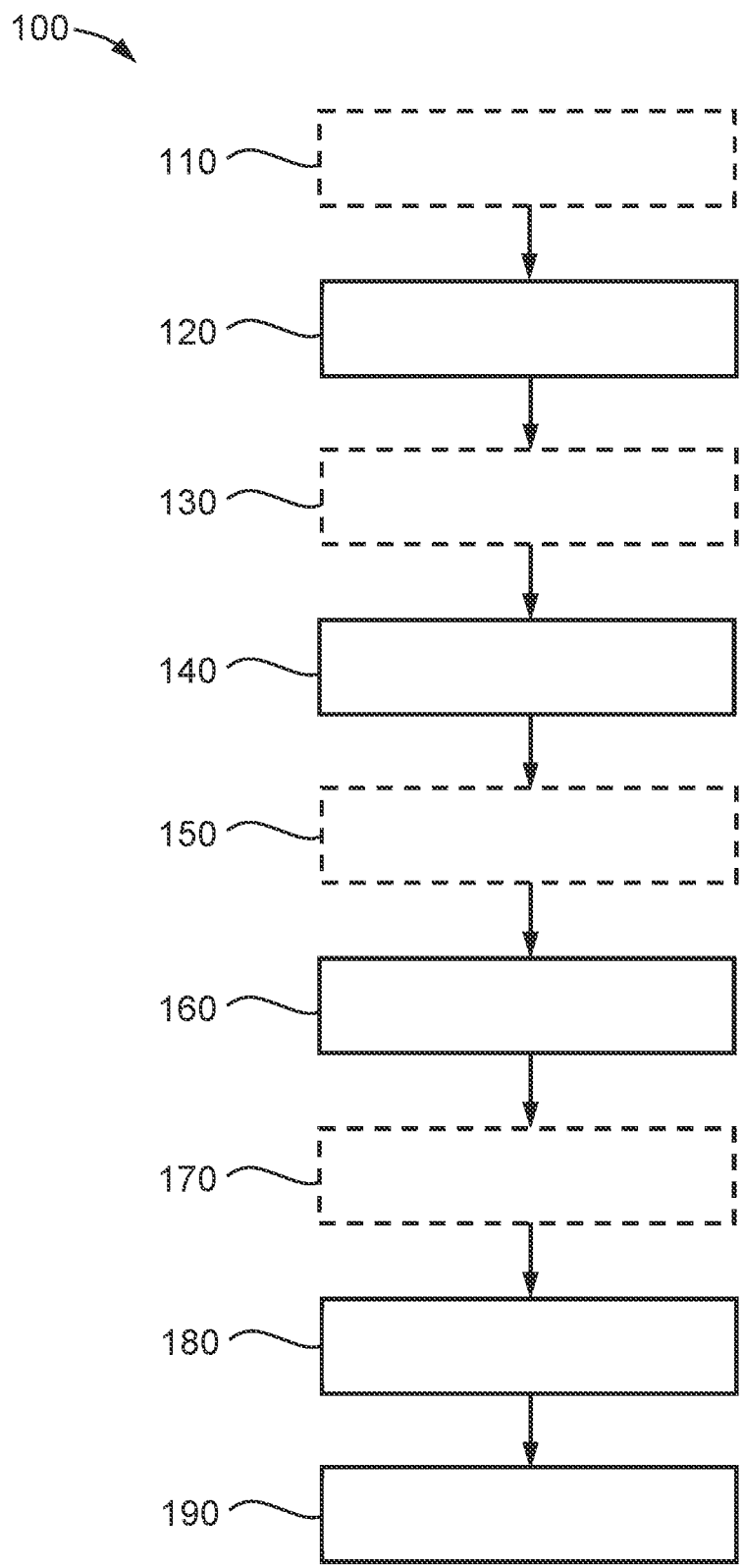
FIGS. 15-16 are flowcharts illustrating first and second methods, respectively, of manufacturing an electric motor assembly.

FIG. 15 shows a flowchart illustrating a first method 100 of manufacturing an electric motor assembly 20 as described herein. The method 100 includes a series of steps, represented by the numbered blocks in the flowchart. At step 140, a stator 40 is disposed within a housing 22 such that a gap 48 is defined between the stator 40 and the housing 22 and such that the stator 40 is not directly connected to the housing 22. At step 160, the gap 48 is then substantially filled with a polymer 50 capable of fastening the stator 40 to the housing 22 by using only the polymer 50. The method 100 may further include, at step 180, curing the polymer 50 such that the stator 40 is fastened to the housing 22 by only the polymer 50. In this embodiment, the polymer 50 may have material characteristics which provide a predetermined electrical filtering of electrical noise between the stator 40 and the housing 22 when the polymer 50 is cured.

The method 100 may further include, at any of steps 110, 130, 150 or 170, inserting an arcuate metallic strip 70 within the gap 48, wherein the arcuate metallic strip 70 may be configured as one of (i) a flat shape configuration 72 wherein the arcuate metallic strip 70 is spaced apart from both the stator 40 and the housing 22, and (ii) a wavy shape configuration 74 wherein the arcuate metallic strip 70 is disposed in contact with both the stator 40 and the housing 22, one of the stator 40 and the housing 22, or neither of the stator 40 and the housing 22. (Note that the blocks of steps 110, 130, 150 and 170 are shown in dashed lines; this is to indicate that the optional step of inserting the arcuate metallic strip 70 may be performed at any one of these points in the method 100.)

The method 100 may also include, at step 120, forming a first network 90 of sacrificial elements 92 made of a sacrificial material on a generally cylindrical outer surface 44 of the stator 40, and, at step 190, removing the sacrificial material after curing the polymer 50 (e.g., by etching, deflagration, etc.) so as to form a second network 94 of cooling channels 96 on the generally cylindrical outer surface 44 of the stator 40. The sacrificial elements 92 may be sized, shaped and arranged as interconnected tubes, runners, manifolds and the like, including inlets and outlets which may include or interface with fluid connectors or couplings. Note that in step 120 the first network 90 is filled with sacrificial material, and when the sacrificial material is removed in step 190 the resulting second network 94 occupies essentially the same space as was previously occupied by the first network 90. The sacrificial material may be any material that is capable of being disposed or deposited on the outer surface 44 to form the first network 90 of sacrificial elements 92, and capable of withstanding the pressure of the polymer 50 being disposed within the gap 48 (e.g., by injection of the polymer 50 into the gap 48) without disturbing the first network 90 of sacrificial elements 92. The sacrificial material should also be chemically compatible with the polymer 50, and the chemicals (e.g., etchants) or processes (e.g., deflagration) used to remove the sacrificial material should also be chemically and otherwise compatible with the polymer 50.

Figure 17:
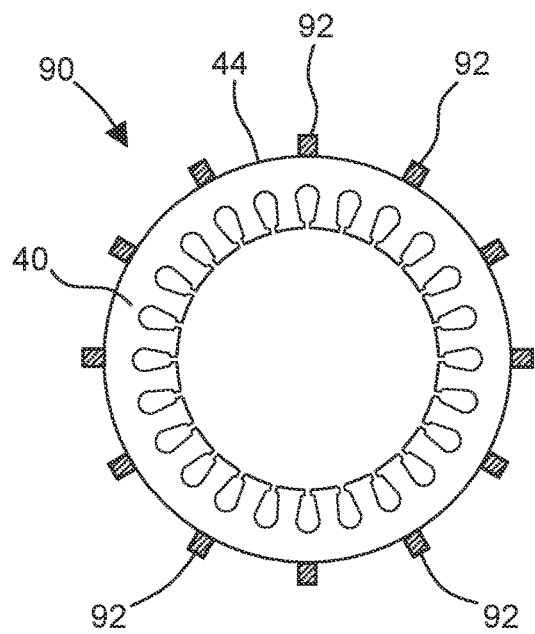
FIGS. 17-20 are schematic cross-sectional elevation views illustrating successive steps for forming cooling channels in an electric motor assembly using sacrificial elements.
Figure 18:
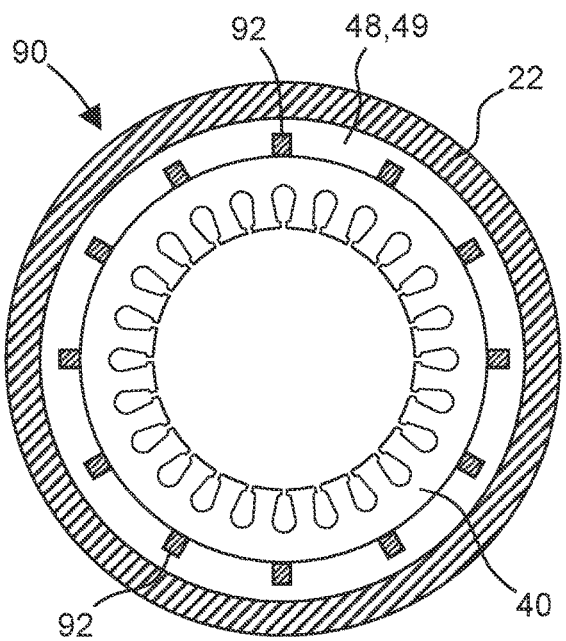
Figure 19:
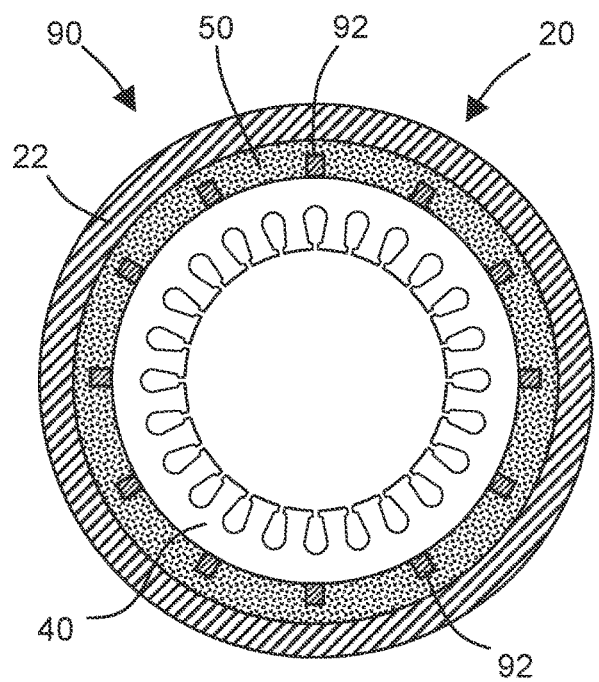
Figure 20:
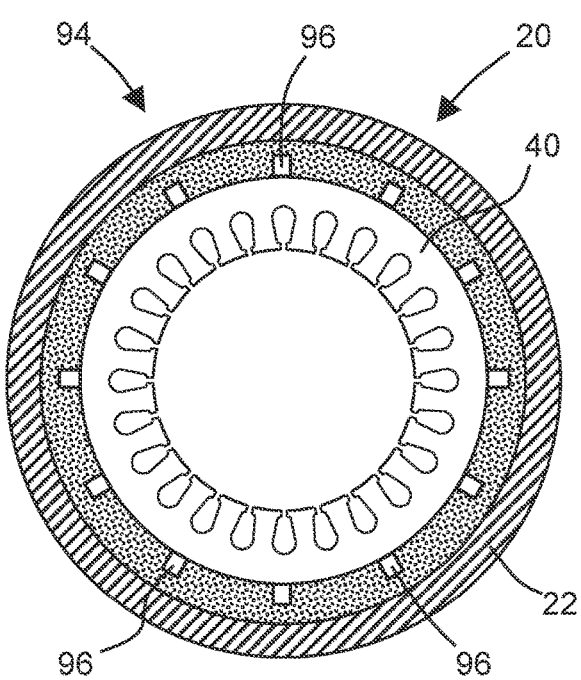

FIGS. 17-20 illustrate successive process steps for forming the cooling channels 96 within the electric motor assembly 20 according to the first method 100. First, FIG. 17 illustrates step 120, in which the first network 90 of sacrificial elements 92 is formed on the generally cylindrical outer surface 44 of the stator 40. Second, FIG. 18 illustrates step 140, in which the stator 40 is disposed within the housing 22 such that the generally cylindrical outer surface 44 of the stator 40 is spaced apart from the generally cylindrical inner surface 24 of the housing 22 by a gap 48, and with the stator 40 being not directly connected to the housing 22. In this step, the sacrificial elements 92 are disposed within the gap 48. Third, FIG. 19 illustrates step 160, in which the gap 48 is substantially filled with the polymer 50 (such as by injection). And fourth, FIG. 20 illustrates step 190, in which the sacrificial material is removed after curing the polymer 50 so as to form the second network 94 of cooling channels 96 on the outer surface 44 of the stator 40.

Figure 16:
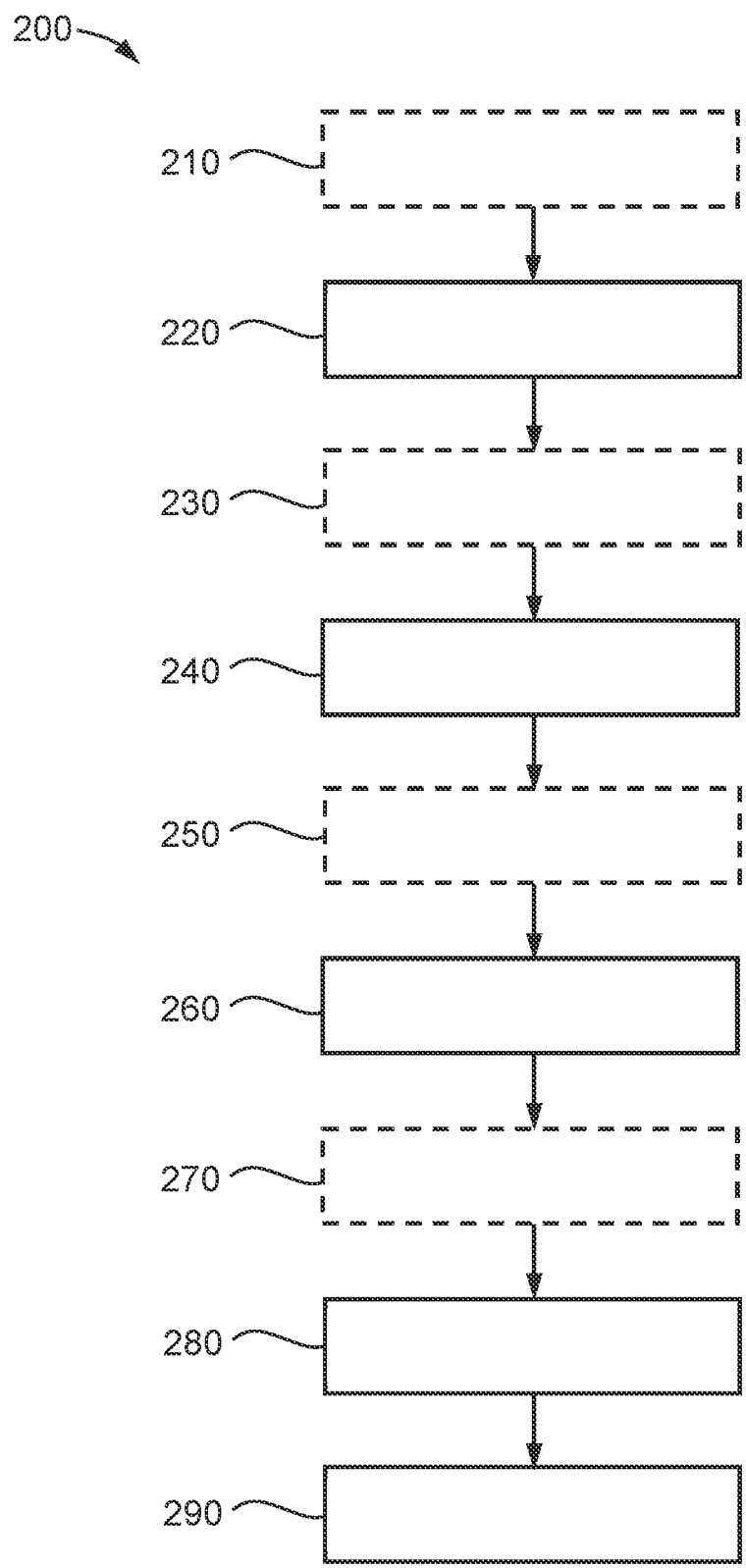

FIG. 16 shows a flowchart illustrating a second method 200 of manufacturing an electric motor assembly 20 as described herein. This second method 200 shares some similarities with the first method 100 described above, but with some differences. At step 240, a stator 40 is coated with polymer 50, such as by dipping the stator 40 in a container of liquid (e.g., uncured) polymer 50, and at step 260 the coated stator 40 is disposed within a housing 22 such that a gap 48 is defined between the stator 40 and the housing 22 and the stator 40 is not directly connected to the housing 22. Optionally, steps 240 and 260 may be combined, such as by first placing liquid polymer 50 within an upturned housing 22 (such that the housing's internal cavity 26 serves as a container for the liquid polymer 50), and then inserting the stator 40 into the cavity 26, thereby coating the stator 40 with the polymer 50 as well as disposing the stator 40 within the cavity 26. In any case, the gap 48 between the stator 40 and housing 22 is substantially filled with the polymer 50, with the polymer 50 being capable of fastening the stator 40 to the housing 22 in a cured state using only the polymer 50. The method 200 may further include, at step 280, curing the polymer 50 such that the stator 40 is fastened to the housing 22 by only the polymer 50. In this embodiment, the polymer 50 may have material characteristics which provide a predetermined electrical filtering of electrical noise between the stator 40 and the housing 22 when the polymer 50 is cured.

Similar to the first method 100, the second method 200 may further include, at any of steps 210, 230, 250 or 270, inserting an arcuate metallic strip 70 within the gap 48, wherein the arcuate metallic strip 70 may be configured as one of (i) a flat shape configuration 72 wherein the arcuate metallic strip 70 is spaced apart from both the stator 40 and the housing 22, and (ii) a wavy shape configuration 74 wherein the arcuate metallic strip 70 is disposed in contact with both the stator 40 and the housing 22, one of the stator 40 and the housing 22, or neither of the stator 40 and the housing 22. (The blocks of steps 210, 230, 250 and 270 are shown in dashed lines to indicate that the optional step of inserting the arcuate metallic strip 70 may be performed at any one of these points in the method 200.)

The method 200 may also include, at step 220, forming a first network 90 of sacrificial elements 92 made of a sacrificial material on a generally cylindrical outer surface 44 of the stator 40, and, at step 290, removing the sacrificial material after curing the polymer 50 so as to form a second network 94 of cooling channels 96 on the generally cylindrical outer surface 44 of the stator 40. FIGS. 17, 19 and 20 illustrate successive process steps for forming the cooling channels 96 within the electric motor assembly 20 according to the second method 200. First, FIG. 17 illustrates step 220, in which the first network 90 of sacrificial elements 92 is formed on the generally cylindrical outer surface 44 of the stator 40. Second, FIG. 19 illustrates step 260, in which the coated stator 40 is disposed within the housing 22 such that a gap 48 is defined between the stator 40 and the housing 22 and the stator 40 is not directly connected to the housing 22. And third, FIG. 20 illustrates step 290, in which the sacrificial material is removed after curing the polymer 50 so as to form the second network 94 of cooling channels 96 on the outer surface 44 of the stator 40.

The above description is intended to be illustrative, and not restrictive. While the dimensions and types of materials described herein are intended to be illustrative, they are by no means limiting and are exemplary embodiments. In the following claims, use of the terms "first", "second", "top", "bottom", etc. are used merely as labels, and are not intended to impose numerical or positional requirements on their objects. As used herein, an element or step recited in the singular and preceded by the word "a" or "an" should be understood as not excluding plural of such elements or steps, unless such exclusion is explicitly stated. Additionally, the phrase "at least one of A and B" and the phrase "A and/or B" should each be understood to mean "only A, only B, or both A and B". Moreover, unless explicitly stated to the contrary, embodiments "comprising" or "having" an element or a plurality of elements having a particular property may include additional such elements not having that property. And when broadly descriptive adverbs such as "substantially" and "generally" are used herein to modify an adjective, these adverbs mean "for the most part", "to a significant extent" and/or "to a large degree", and do not necessarily mean "perfectly", "completely", "strictly" or "entirely". Additionally, the word "proximate" may be used herein to describe the location of an object or portion thereof with respect to another object or portion thereof, and/or to describe the positional relationship of two objects or their respective portions thereof with respect to each other, and may mean "near", "adjacent", "close to", "close by", "at" or the like.

This written description uses examples, including the best mode, to enable those skilled in the art to make and use devices, systems and compositions of matter, and to perform methods, according to this disclosure. It is the following claims, including equivalents, which define the scope of the present disclosure.

What is claimed is:

1. An electric motor assembly, comprising:
   a housing having a generally cylindrical inner surface defining a generally cylindrical cavity within the housing;
   a stator operatively disposed within the generally cylindrical cavity, the stator comprising a plurality of stacked laminations wherein each lamination has an outer circumferential edge and a plurality of finger elements extending inward toward a center of the lamination;
   a layer of polymer disposed between a generally cylindrical outer surface of the stator and the generally cylindrical inner surface of the housing, such that the stator is bonded to the housing by the polymer; and
   an arcuate metallic strip circumferentially disposed within the layer of polymer, wherein the arcuate metallic strip is configured as one of (i) a flat shape configuration wherein the arcuate metallic strip is spaced apart from both the stator and the housing, and (ii) a wavy shape configuration wherein the arcuate metallic strip is disposed in contact with only one of the stator and the housing or neither of the stator and the housing, wherein the arcuate metallic strip is formed integral with an outer circumferential edge of one of the laminations.

2. An electric motor assembly according to claim 1, wherein a gap having a generally cylindrical shell shape is defined between the stator and the housing, and wherein the layer of polymer substantially fills the gap.

3. An electric motor assembly according to claim 1, wherein none of the laminations is directly connected to the housing.

4. An electric motor assembly according to claim 1, wherein the stator is not directly connected to the housing.

5. An electric motor assembly according to claim 1, wherein the stator is fastened to the housing by only the polymer.

6. An electric motor assembly according to claim 1, further comprising:
   a rotor operatively disposed within a generally cylindrical inner stator cavity.

7. An electric motor assembly according to claim 1, wherein the layer of polymer is effective to prevent rotation of the stator with respect to the housing.

8. An electric motor assembly according to claim 1, wherein the polymer has material characteristics which provide a predetermined electrical filtering of electrical noise between the stator and the housing.

9. An electric motor assembly according to claim 1, wherein the housing includes a plurality of protrusions each extending inward from the generally cylindrical inner surface and the stator includes a plurality of protuberances each extending outward from the generally cylindrical outer surface, wherein the protrusions and protuberances are interleaved with each other and spaced apart from each other without any contact therebetween.

10. An electric motor assembly according to claim 1, wherein a network of cooling channels is formed in the layer of polymer by forming a network of sacrificial elements made of a sacrificial material on an outer cylindrical surface of the stator and subsequently removing the sacrificial material after curing the polymer.

11. An electric motor assembly, comprising:
a metal housing having a generally cylindrical inner surface defining a generally cylindrical cavity within the housing;
a stator operatively disposed within the generally cylindrical cavity, the stator comprising a plurality of stacked metallic laminations wherein each lamination has an outer circumferential edge and a plurality of finger elements extending inward toward a center of the lamination, wherein a gap having a generally cylindrical shell shape is defined between the stator and the housing and none of the laminations is directly connected to the housing;
a layer of polymer substantially filling the gap disposed between an outer cylindrical surface of the stator and the inner cylindrical surface of the housing, such that the stator is fastened to the housing by only the polymer; and
an arcuate metallic strip circumferentially disposed within the layer of polymer, wherein the arcuate metallic strip is configured as one of (i) a flat shape configuration wherein the arcuate metallic strip is spaced apart from both the stator and the housing, and (ii) a wavy shape configuration wherein the arcuate metallic strip is disposed in contact with only one of the stator and the housing or neither of the stator and the housing, wherein the arcuate metallic strip is formed integral with an outer circumferential edge of one of the laminations;
wherein the polymer has material characteristics which provide a predetermined electrical filtering of electrical noise between the stator and the housing.

12. An electric motor assembly according to claim 11, further comprising:
a rotor operatively disposed within a generally cylindrical inner stator cavity, wherein the layer of polymer is effective to prevent rotation of the stator with respect to the housing during operation of the electric motor assembly.

13. An electric motor assembly according to claim 11, wherein the housing includes a plurality of protrusions each extending inward from the generally cylindrical inner surface and the stator includes a plurality of protuberances each extending outward from the generally cylindrical outer surface, wherein the protrusions and protuberances are interleaved with each other and spaced apart from each other without any contact therebetween.

14. A method of manufacturing an electric motor assembly, comprising:
disposing a stator comprising a plurality of stacked laminations within a housing such that a gap is defined between the stator and the housing and the stator is not directly connected to the housing;
providing an arcuate metallic strip within the gap, wherein the arcuate metallic strip is configured as one of (i) a flat shape configuration wherein the arcuate metallic strip is spaced apart from both the stator and the housing, and (ii) a wavy shape configuration wherein the arcuate metallic strip is disposed in contact with only one of the stator and the housing or neither of the stator and the housing, wherein the arcuate metallic strip is formed integral with an outer circumferential edge of one of the laminations; and
substantially filling the gap with a polymer capable of fastening the stator to the housing by only the polymer.

15. A method according to claim 14, further comprising:
curing the polymer such that the stator is fastened to the housing by only the polymer.

16. A method according to claim 15, further comprising:
forming a network of sacrificial elements made of a sacrificial material on a generally cylindrical outer surface of the stator; and
removing the sacrificial material after curing the polymer so as to form a network of cooling channels on the generally cylindrical outer surface of the stator.

17. A method according to claim 14, wherein the polymer has material characteristics which provide a predetermined electrical filtering of electrical noise between the stator and the housing when the polymer is cured.

* * * * *